United States Patent [19]

Iijima et al.

[11] Patent Number: 5,554,966

[45] Date of Patent: Sep. 10, 1996

[54] CAR-STEREO WITH REMOVABLE CONTROL PANEL, ALARM, AND POWER CONSERVATION

[75] Inventors: Takayuki Iijima; Yoshio Aoyagi; Shigetoshi Kato; Osamu Yoshizawa; Hiroshi Wakimoto; Akira Kawahara; Akio Namiki, all of Kawagoe, Japan

[73] Assignee: Pioneer Electronic Corporation, Tokyo, Japan

[21] Appl. No.: 6,245

[22] Filed: Jan. 19, 1993

[30] Foreign Application Priority Data

Jan. 20, 1992 [JP] Japan .................................. 4-006311 U
Jan. 20, 1992 [JP] Japan .................................. 4-006312 U
Jan. 24, 1992 [JP] Japan .................................. 4-007432 U

[51] Int. Cl.$^6$ ..................................................... G08B 21/00
[52] U.S. Cl. .......................... 340/687; 340/457; 340/426; 307/10.2
[58] Field of Search ..................................... 340/457, 426, 340/687; 455/346, 348, 351; 307/10.2, 39, 34, 31

[56] References Cited

U.S. PATENT DOCUMENTS

| | | | |
|---|---|---|---|
| 4,700,221 | 10/1987 | Yamamozo | 307/34 |
| 4,945,335 | 7/1990 | Kimura | 455/348 |
| 4,980,836 | 12/1990 | Carter | 307/31 |
| 5,387,820 | 2/1995 | Imagawa | 307/39 |

FOREIGN PATENT DOCUMENTS

| | | |
|---|---|---|
| 0451406 | 10/1991 | European Pat. Off. . |
| 0448864 | 10/1991 | European Pat. Off. . |
| 0513455 | 11/1992 | European Pat. Off. . |
| 3743218 | 6/1989 | Germany . |

Primary Examiner—John K. Peng
Assistant Examiner—Albert K. Wong
Attorney, Agent, or Firm—Perman & Green

[57] ABSTRACT

An audio apparatus having a detachable control panel or operating-part main unit includes a microcomputer for detecting an OFF state of an ACC position of the ignition key, or the attached/detached state of the operating-part main unit. When such states are detected, normal operations of the microcomputer; namely, the operations to turn on an SWD $V_{DD}$ terminal and an A/D port and to set a KEY DATA terminal into a standby mode, are stopped intermittently in order to execute a low consumption process in which electric power is consumed only for holding information in memory in the microcomputer. When the microcomputer detects the OFF state of the ignition key or the OFF state of an installation detection switch and, an alarm ON state is set in the memory in the microcomputer, then an alarm sound is generated from a speaker for a predetermined time. When the alarm sound is unnecessary, the state of the memory in the microcomputer can be updated to an alarm OFF state by depressing a function button and operating the ignition key. When the installation detection section detects the removal of the operating-part main unit, on the basis of a decrease in voltage value of an installation detection switch section and CPU recognizing the removal of the operation-part main unit, a control section sends control signals to a power supply limiting circuit and a data transmission switch section.

3 Claims, 11 Drawing Sheets

PRIOR ART

PRIOR ART

FIG. 7(a)
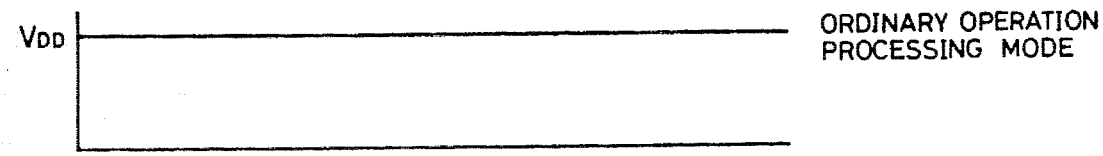
ORDINARY OPERATION PROCESSING MODE
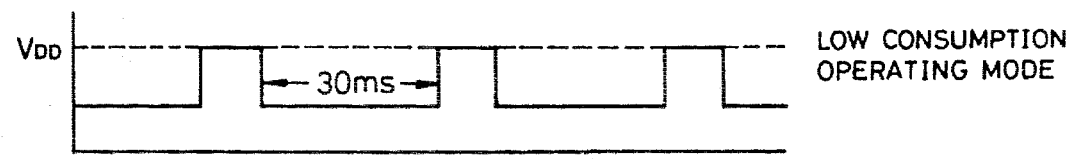
LOW CONSUMPTION OPERATING MODE
FIG. 7(b)

CAR-STEREO WITH REMOVABLE CONTROL PANEL, ALARM, AND POWER CONSERVATION

BACKGROUND OF THE INVENTION

1. Field of the Invention

The present invention relates to a car-stereo equipment having an operating-part main unit which is detachably provided, for example, with respect to an apparatus main unit.

2. Description of Background Information

As a measure for providing anti-theft capabilities with the trend of high-grade audio apparatuses, e.g., car stereo receiver/cassette-player, there already have been marketed car stereo equipments of the detachable type constructed in such a manner that the operating-part main unit, also called a control panel, is detachable, or of the quick release type constructed in such a manner that the principal electronics or apparatus main unit itself can be easily mounted into or detached from an installation position in a vehicle. As used herein, the term "operating-part main unit" is intended to mean a user actuated control unit or panel that is removably connected to an apparatus main unit. As used herein, the term "apparatus main unit" is intended to mean a unit having the principal electronics of the car-stereo equipment, such as the radio electronics, CD-player and tape player.

The detachable type car stereo equipments are designed to make it difficult to recognize the existence of the apparatus by removing the operating-part main unit from the apparatus main unit when the driver leaves the vehicle. On the other hand, the driver may often forget to remove the operating-part main unit from the apparatus main unit, so the driver is informed of such an overlook by an alarm in the case of some apparatuses.

FIGS. 1 and 2 show an example of a car-stereo receiver/cassette player of the detachable type which is designed to have the anti-theft feature mentioned above. An operating-part main unit 20 is detachably provided with respect to an apparatus main unit 10 which is mounted into a dash board or the like of a vehicle. A concave fitting portion 11 to receive the operating-part main unit 20 is formed at the front end of the apparatus main unit 10. A connector 12 is provided at a position near the right-hand side in the concave fitting portion 11.

A shutter 13 is slidably provided near the connector 12. By sliding the shutter 13 in the closing direction, each terminal in the connector 12, which will be explained hereinafter, will be concealed.

A cassette insertion slot 14 is formed at a central position in the concave fitting portion 11. An installation detection switch 15 for detecting the mounting of the operating-part main unit 20 is provided at a left-side position adjacent to the cassette insertion slot 14.

The connector 12 has a 5 V power supply terminal 12a, a data input/output (I/O) terminal 12b, an 8 V power supply terminal 12c, and a ground terminal 12d. A 5 V power supply circuit 17 is connected to the 5 V power supply terminal 12a. An 8 V power supply circuit 18 is connected to the 8 V power supply terminal 12c.

An electric power from a battery 31 of the vehicle is supplied to the 5 V power supply circuit 17 and 8 V power supply circuit 18 through a backup line 31a and an ACC line 31b. Reference numeral 30 denotes an ignition key. When the ignition key 30 is OFF, the power supply through the ACC line 31b is stopped. In this description, ON/OFF state of the ignition key 30 means the ON/OFF state of the ACC position.

A microcomputer 19 is connected to the I/O terminal 12b. The microcomputer 19 monitors the change in voltage at the ACC position in the ignition key 30 through a line 31d so that it recognizes that the ACC position is OFF when the voltage at the ACC position is at a low level.

A connector 21 which is to be connected to the connector 12 on the apparatus main unit 10 is provided on the rear side of the operating-part main unit 20. Various kinds of function buttons 22 such as preset buttons and the like are arranged at the bottom level on the front face of the operating-part main unit 20. A display section 23 to display information such as time, receiving frequency, and the like is provided at the middle level on the front face of the operating-part main unit 20. A cassette insertion port 24, which connects to the cassette insertion slot 14 on the apparatus main unit 10 when the operating-part main unit 20 is attached, is formed at the upper stage on the front side of the operating-part main unit 20.

The connector 21 has a 5 V power supply terminal 21a, a data I/O terminal 21b, an 8 V power supply terminal 21c, and a ground terminal 21d in correspondence to the terminals of the connector 12.

A microcomputer 25 is connected to the 5 V power supply terminal 21a and also to data I/O terminal 21b. The microcomputer 25 generates control signals to instruct the display of information such as time, receiving frequency, and the like in accordance with an operating mode of various kinds of function buttons 22. A display driver 26 controls the display operation of the display section 23 on the basis of the control signal from the microcomputer 25. An illuminating lamp 27 is connected to the 8 V power supply terminal 21c.

The fundamental operation of the car stereo equipment having a construction as mentioned above will now be described hereinafter.

An attached/detached state of the operating-part main unit 20 for the apparatus main unit 10 is discriminated by detecting the ON/OFF state of the installation detection switch 15 by the microcomputer 19. When the microcomputer 19 recognizes the attached state of the operating-part main unit 20, predetermined control data is sent to the data I/O terminal 12b.

In this instance, a driving electric power of 5 V is supplied to the microcomputer 25 in the operating-part main unit 20 through the 5 V power supply terminals 21a and 12a due to the coupling of the connectors 12 and 21. When receiving the driving electric power, the microcomputer 25 immediately executes a resetting operation and, after that, receives the control data from the microcomputer 19 through the data I/O terminals 12b and 21b, thereby allowing the display driver 26 to execute a predetermined operation on the basis of the control data received.

In this instance, the driving power of 8 V is supplied to the 8 V power supply terminal 12c. For instance, when a lamp light-on switch (not shown) of the vehicle is ON, the illuminating lamp 27 receives the driving power of 8 V and is lit on.

When the operating-part main unit 20 is removed from the apparatus main unit 10, the installation detection switch 15 is turned off. When the microcomputer 19 detects the OFF state of the switch 15, the transmission of the control data to the data I/O terminal 12b is stopped. Since the control data is not sent to the microcomputer 25 as mentioned above, even when the data I/O terminal 12b of the connector 12 may erroneously come into contact with the data I/O terminal 21b of the connector 21 after the operating-part main unit 20 has been removed, an erroneous display by the display section 23 or the like is prevented.

By sliding the shutter 13 in the closing direction after the operating-part main unit 20 has been removed from the apparatus main unit 10, each terminal in the connector 12 can be covered, so that an electric shock, short-circuit, or the like is also prevented.

The manner of an electric power supply from the battery 31 in association with the ON/OFF state of the ignition key 30 is as follows.

The electric power from the battery 31 is supplied to the 5 V power supply circuit 17 through the backup line 31a irrespective of the ON/OFF of the ignition key 30. The 5 V power supply circuit 17 supplies a driving electric power mainly to the microcomputer 19. When the driving of a CPU (not shown) in the microcomputer 19 is stopped, the 5 V power supply circuit 17 is used mainly as a backup power source of a memory (not shown) in the microcomputer 19.

When the ignition key 30 is turned on, the ACC line 31b and the battery 31 are connected and the electric power from the battery 31 is supplied to the 8 V power supply circuit 18 through the ACC line 31b. The 8 V power supply circuit 18 is mainly used as a driving power source of a tape loading mechanism (not shown), the illuminating lamp 27 on the operating-part main unit 20, and the like.

When the ignition key 30 is turned off, the ACC line 31b is disconnected from the battery 31. Regarding the 5 V power supply circuit 17, however, as mentioned above, even when the ignition key 30 is turned off, the electric power from the battery 31 is supplied to the 5 V power supply circuit 17 through the backup line 31a.

A consuming state of the electric power in the microcomputer 19 in association with the ON/OFF of the ignition key 30 is as follows.

The microcomputer 19 monitors the change in voltage at the ACC position in the ignition key 30 through the line 31d. When the microcomputer 19 detects a voltage drop at the ACC position as result of the turn-off of the ignition key 30, predetermined operations of the CPU in the microcomputer 19 are halted. In this state, only the memory in the microcomputer 19 receives the electric power from the 5 V power supply circuit 17, so that it continuously holds the information.

With respect to modes of the electric power consumption in the microcomputer 19, therefore, when the ignition key 30 is turned on, an ordinary operation processing mode or ordinary power consuming mode is set. However, when the ignition key 30 is turned off, predetermined operations of the CPU are halted, so that a low consuming mode is set and no dark current is generated from the 5 V power supply circuit 17, so that the inconvenience such that the voltage in the battery 31 is completely extinguished is eliminated. As used herein, the terms "low power consuming" and "low consumption" are intended to mean a rate of consumption less than the ordinary power consumption mode.

With the car stereo equipments installed in the vehicle having the ACC position as mentioned above, the microcomputer 19 monitors a change in voltage at the ACC position in the ignition key 30. When the ignition key 30 is turned off, predetermined operations of the CPU in the microcomputer 19 are halted and the low consuming mode is set. The generation of the dark current is, accordingly, eliminated and the complete extinction of the voltage of the battery 31 is prevented.

There are, however, vehicles of which the ignition key 30 does not have the ACC position described above. In case of the vehicles with an ignition key having no ACC position, the following inconvenience occurs.

With such vehicles, the backup line 31a and the ACC line 31b are connected via a short-circuit line 31c in the configuration shown in FIG. 2. Therefore, even when the ignition key 30 is turned off, the electric power from the battery 31 is continuously supplied to the 5 V power supply circuit 17 and 8 V power supply circuit 18, so that operations in such a state become equivalent to those in a state in which the foregoing ACC position is always turned ON.

Therefore, the CPU in the microcomputer 19 is placed in the operating mode irrespective of the turn-off of the ignition key 30, and the electric power for driving the CPU itself is also supplied in addition to the electric power to be supplied to only the memory in the microcomputer 19. Consequently, there arises a drawback such that a large amount of dark current flows and the energy of the battery may be consumed completely.

There are also types of audio apparatus that have a detachable operating-part main unit with an alarm. These apparatus are designed to sound the alarm when a user negligently fails or forgets to remove the operating-part. This alarm notification ensures that the user detaches the operating-part main unit from the apparatus main unit.

FIG. 3 shows a car-stereo equipment of the detachable type as an example of such audio apparatuses. In addition to the component elements of the car stereo shown in FIG. 2, a driving circuit 16a connected to the microcomputer 19 and a speaker 16 which is actuated by the driving circuit 16a are provided.

With such a construction as mentioned above, when the microcomputer 19 detects the negligence of the removal of the operating-part main unit 20 in the OFF state of the ignition key 30, the speaker 16 is activated through the driving circuit 16a, thereby generating an alarm sound.

That is, the microcomputer 19 detects the ON/OFF state of the ignition key 30. In the OFF state of the ignition key 30, when the microcomputer 19 detects by the installation detection switch 15 that the operating part main unit 20 is in an attaching state, the speaker 16 is activated through the driving circuit 16a so that alarm sound is generated, thereby warning the user that he has forgotten to remove the operating-part main unit 20.

When the ignition key 30 is turned off and the driver leaves from the vehicle, accordingly, the negligence of the removal of the operating-part main unit 20 is informed by the alarm sound, thereby the driver can be aware that he has forgotten to remove the operating-part main unit 20 from the apparatus main unit 10.

With the conventional car-stereo equipments described above, by warning the negligence of the removal of the operating-part main unit 20 by the alarm sound, negligence of the removal of the operating-part main unit 20 can be easily recognized. However, since the operation of the apparatus is set so that ringing of the alarm sound is repeated each time the ignition key 30 is turned off, there can be a case where the user feels the alarm sound rasping.

Such a drawback would become more notable as the frequency of conditions where the ignition key 30 is turned off after the vehicle has stopped.

FIG. 4 shows another example of car-stereo equipments of the detachable type. In this example, a protecting circuit 36 is provided in the apparatus main unit 10. The protecting circuit 36 is connected between the 5 V power supply terminal 12a and the 8 V power supply terminal 12c and between the 5 V power supply circuit 17 and the 8 V power supply circuit 18.

When a short-circuit occurs between the 5 V power supply terminal 12a and another terminal or between the 8 V power supply terminal 12c and another terminal or the like, the microcomputer 19 detects such a short-circuit and immediately makes the protecting circuit 36 operative, thereby shutting off the power supplies from the 5 V power supply circuit 17 and 8 V power supply circuit 18.

By this operation, even in cases where any one of the terminals on the apparatus main unit 10 which is exposed is erroneously short-circuited or static electricity is applied to any one of the terminals, the protecting circuit 36 immediately operates, so that a breakage of the internal circuit of the apparatus main unit 10 is prevented.

In the conventional car stereo equipment mentioned above, after the operating-part main unit 20 has been removed from the apparatus main unit 10, the shutter 13 is slid in the closing direction and the terminals in the connector 12 are covered, thereby preventing an electric shock, a short-circuit, or the like.

In another car stereo equipment, a protecting circuit 36 is provided on the apparatus main unit 10 and when the microcomputer 19 detects the short-circuit occurring between any terminals, the protecting circuit 36 is immediately made operative and the power supplies from the 5 V power supply circuit 17 and 8 V power supply circuit 18 are shut off, thereby preventing damages to the internal circuit of the apparatus main unit 10.

According to the former car stereo equipment, however, in order to prevent an electric shock, a short-circuit, or the like, the shutter 13 is slidably provided. In designing car stereo equipments whose dimensions or the like are generally limited, accordingly, it is extremely difficult to determine the position of the shutter 13, the position of a sliding mechanism to slide the shutter 13, and the like. Since it is necessary to allow the sliding motion of the shutter 13, parts for the slide of the shutter and the like are also needed. This also leads to a drawback that the increase in number of parts causes increase in the cost of the car stereo equipment. Further, the shutter 13 often has a structure such that it is manually opened or closed for the purpose of cost reduction. Not only the opening/closing operation of the shutter 13 is troublesome but also the user may frequently forget to close the shutter 13, so that the inherent purpose for prevention of the short-circuit or the like cannot be often accomplished.

According to the latter car stereo, on the other hand, in spite of the fact that the breakage of the internal circuit of the apparatus main unit 10 is prevented by the protecting circuit 36 provided in the apparatus main unit 10, the apparatus is constructed by paying an attention to the prevention of the breakage of the internal circuit, so that a structure to prevent the short-circuit of the terminals is not improved yet. Since the apparatus has the protecting circuit 36, drawbacks such that not only the circuit construction of the apparatus main unit 10 is complicated but also the costs of the car stereo rise in a manner similar to that mentioned above still remain.

OBJECTS AND SUMMARY OF THE INVENTION

The present invention is made in consideration of the above circumstances and it is an object of the invention to provide a car stereo which can prevent complete extinction of a battery voltage by blocking the generation of a dark current in an apparatus installed in a vehicle such that an ignition key has no accessary position.

The invention is made in consideration of the foregoing circumstances and another object of the invention is to provide a car stereo which can eliminate an unpleasant feeling caused by alarm by enabling the setting of a ringing of alarm to be appropriately.

The invention is made in consideration of the foregoing circumstances and still another object of the invention is to provide a car stereo having a simple construction in which when a operating-part main unit is removed from the apparatus main unit side, voltages or terminal states of a plurality of terminals for generating a predetermined driving electric power and data on the apparatus main unit side are set to 0 V or an open state, thereby enabling a short-circuit to be certainly prevented.

According to the first aspect of the present invention, to accomplish the above objects, there is provided a car stereo having a operating-part main unit that is detachably provided for an apparatus main unit which is installed in a vehicle, wherein the car stereo comprises: installation detection means for detecting an attaching or detaching state of the operating-part main unit; and mode shifting means for shifting the operation of a microcomputer on the apparatus main unit side from an ordinary operation processing mode to a low consumption operation processing mode when the removal of the operating-part main unit is detected by the installation detection means.

The car-stereo equipment of the present invention intends to prevent a complete extinction of the battery voltage due to an apparatus installed in a vehicle in which the ignition key doesn't have an accessory position. When the removal of the operating-part main unit is detected by the installation detection means, the operation of the microcomputer on the apparatus main unit side is shifted from the ordinary operation processing mode to the low consumption operation processing mode by the mode shifting means.

Consequently, even in the case where the apparatus is installed in a vehicle in which the ignition key doesn't have an accessory position, when the operating-part main unit is removed from the apparatus main unit, the generation of the dark current in the ordinary operating mode in the microcomputer can be blocked, so that the complete extinction of the battery voltage can be prevented.

According to the second aspect of the present invention, to accomplish the above objects, there is provided a car stereo having a operating-part main unit that is detachably provided for an apparatus main unit which is installed in a vehicle, wherein the car stereo comprises: ON/OFF detecting means for detecting an ON/OFF state of an accessory position of an ignition key of the vehicle; installation detection means for detecting an attached/detached state of the operating-part main unit; alarm generating means for generating an alarm; setting means for setting ON/OFF of an alarm from the alarm generating means; and alarm generation control means for controlling the alarm generating means on the basis of the detection of the ON/OFF detecting means and the setting of the setting means.

The car-stereo equipment of the present invention intends to selectively set the ON/OFF state of the alarm based upon user selection and sensed equipment conditions. The attaching of the operating-part main unit is detected by the attaching/detaching detecting means, the OFF state of the accessory position is detected by the ON/OFF detecting means, and when the alarm is set ON by the setting means, the alarm is generated from the alarm generating means.

According to the third aspect of the present invention, to accomplish the above objects, there is provided a car stereo having a operating-part main unit that is detachably provided for an apparatus main unit. The stereo includes an installation detection means for detecting an attaching or detaching state of the operating-part main unit is provided on the apparatus main unit side, a plurality of terminals to generate a predetermined driving electric power and data, and supply limiting means for limiting the supplies of the driving electric power and data to those terminals. When the removal of the operating-part main unit is detected by the installation detection means, the supply limiting means operates to prevent the generation of the driving electric power and data to the plurality of terminals.

The car stereo according to the present invention contemplates to perfectly block the short-circuit among a plurality of terminals which are exposed in terms of the construction when the operating-part main unit is removed from the apparatus main unit. When the removal of the operating-part main unit is detected by the installation detection means, the generation of the driving electric power and data to a plurality of terminals is blocked by the supply limiting means.

When the operating-part main unit is removed, therefore, the voltages and terminal states of a plurality of terminals on the apparatus main unit side can be set to 0 V or the open state. Further, by setting to 0 V or open state, the shutter to cover a plurality of terminals on the apparatus main unit side and the sliding mechanism to slide the shutter which are necessary so far, the protecting circuit to prevent the breakage of the internal circuit when a short-circuit occurs, and the like are also unnecessary.

BRIEF DESCRIPTION OF THE DRAWINGS

FIG. 7 is a diagram showing driving voltages in an ordinary operation processing mode and a low consumption operation processing mode of a microcomputer on the apparatus main unit side of FIG. 5;

DETAILED DESCRIPTION OF THE PREFERRED EMBODIMENTS

Figure 1:
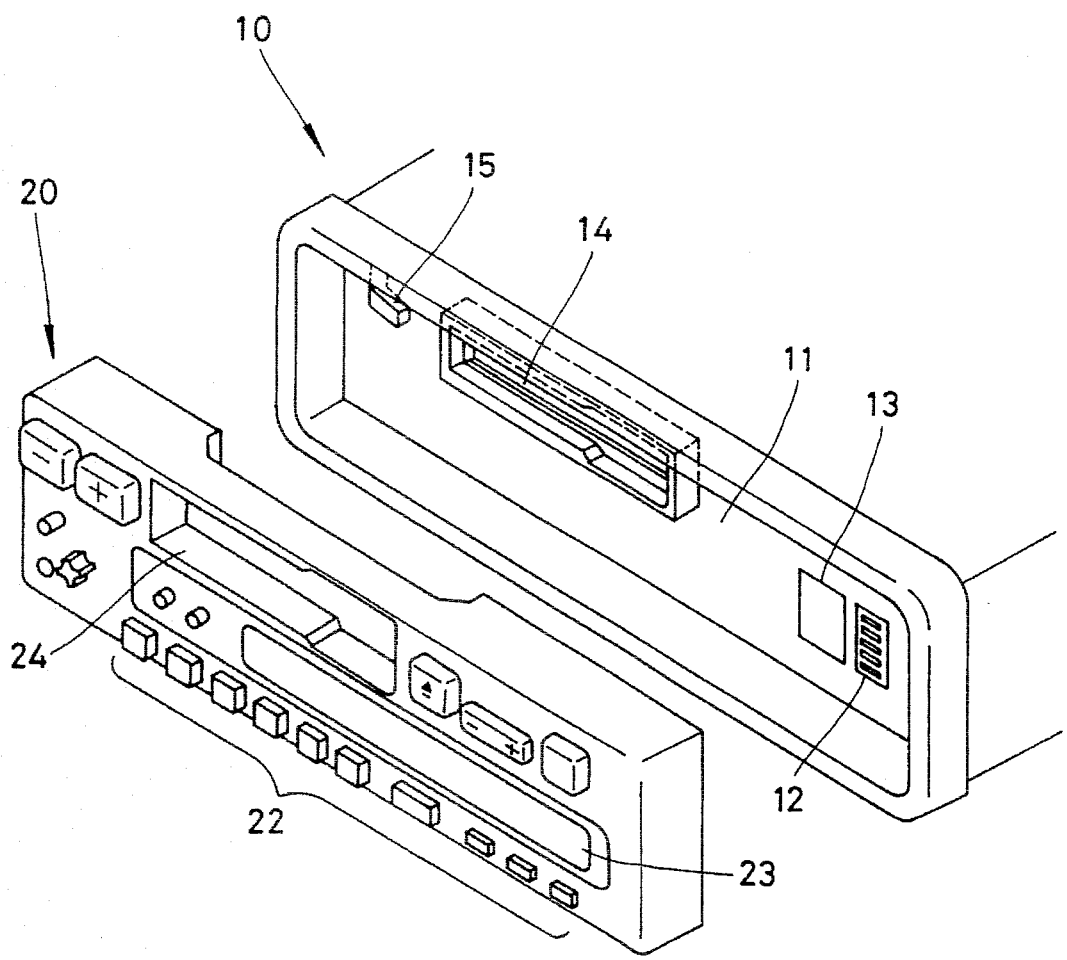
FIG. 1 is a perspective view showing an example of a conventional car-stereo equipment of the detachable type.
Figure 2:
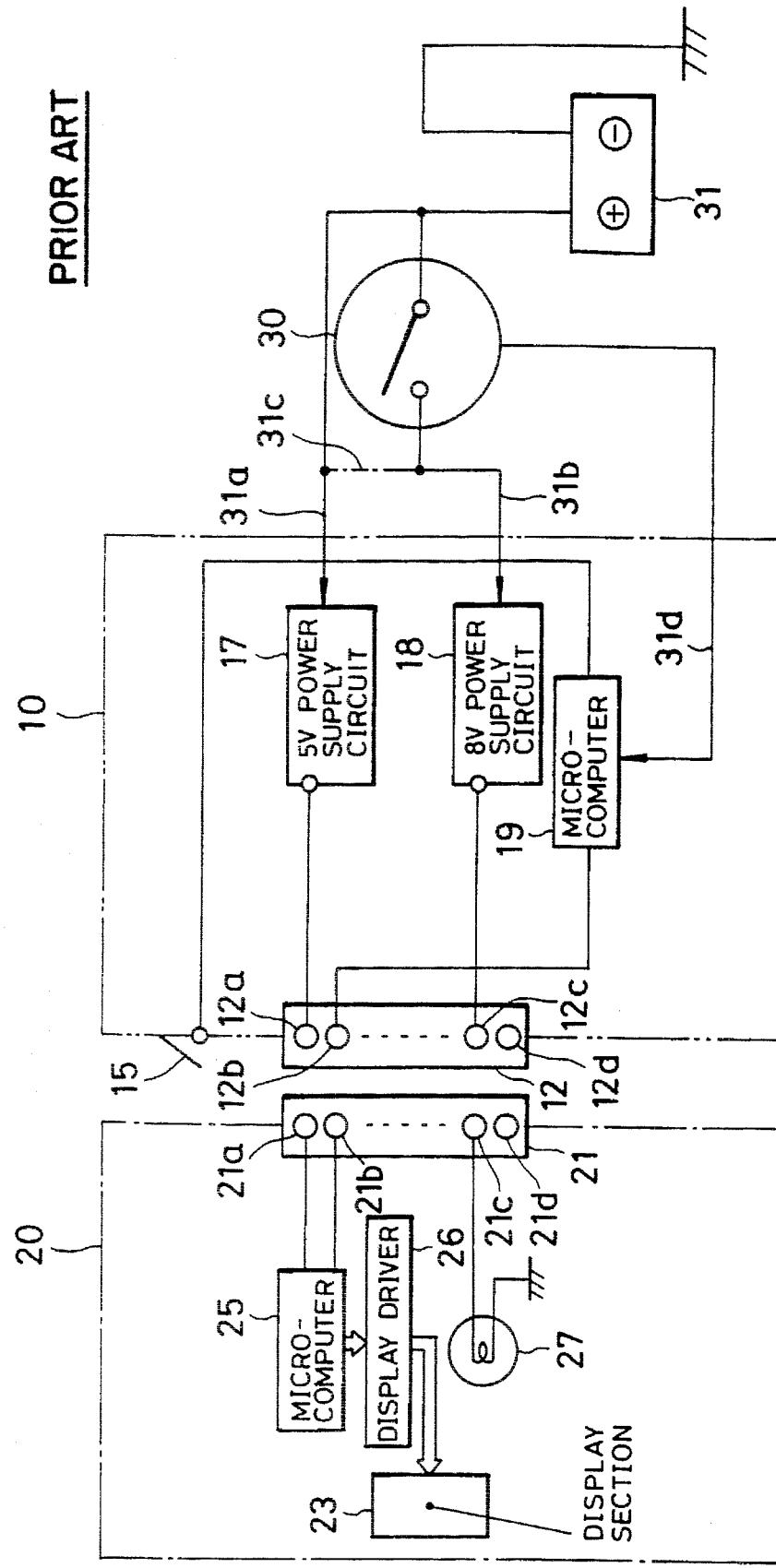
FIGS. 2 and 3 are diagrams showing an apparatus main unit of FIG. 1 and an internal construction on the operating-part main unit side.

The first embodiment of the present invention will be described in detail hereinbelow with reference to the drawings. In the following diagrams, component elements which are common to those shown in FIGS. 1 and 2 are designated by the same reference numerals and their overlapped descriptions are omitted here.

Figure 5:
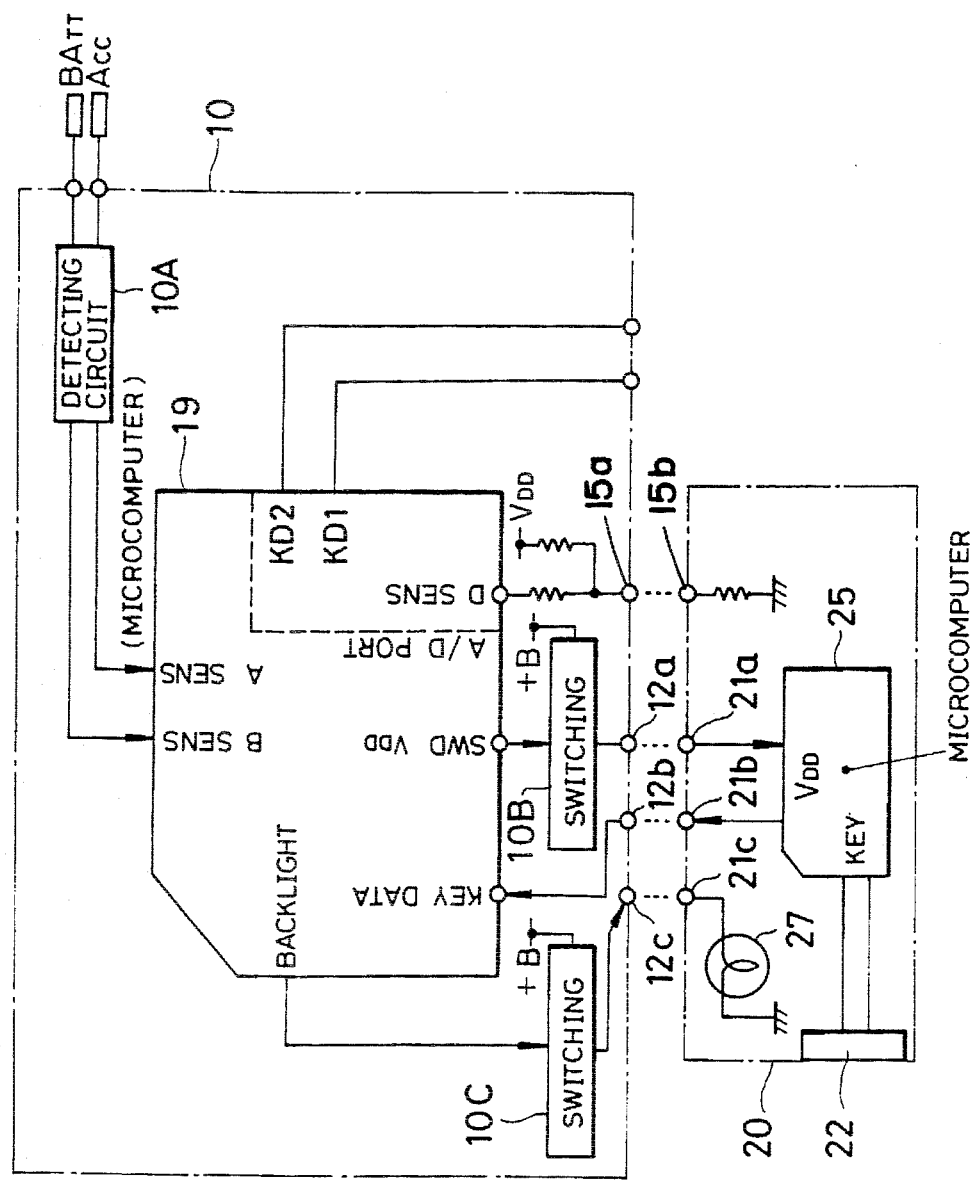
FIG. 5 is a diagram showing an apparatus main unit and an internal construction of the operating-part main unit side according to the first embodiment of a car-stereo equipment of the present invention.

FIG. 5 shows an internal construction of a car-stereo equipment of the present invention. The apparatus main unit 10 has the 5 V power supply terminal 12a, data I/O terminal 12b, 8 V power supply terminal 12c, and a detachment sense terminal 15a. The microcomputer 19 is connected to each of the above terminals. In the diagram, reference numerals 10B and 10C denote switching circuits. When the switching circuits 10B and 10C execute the ON operation by the control of the microcomputer 19, driving electric powers of 8 V and 5 V in FIG. 2 are supplied.

Signals indicative of the results of the detection from a detecting circuit 10A to detect voltage states of the battery and the ACC position are supplied to terminals $A_{SENS}$ and $B_{SENS}$ of the microcomputer 19, respectively.

Analog signals from apparatuses such as an equalizer and the like (not shown) are supplied to terminals $KD_1$ and $KD_2$ of an A/D port of the microcomputer 19, respectively.

When a detachment sense terminal 15b on the operating-part main unit 20 side, which will be explained hereinafter, is connected to the detachment sense terminal 15a, an "L" level signal of a reference voltage $V_{DD}$ is supplied to a terminal $D_{SENS}$ of the microcomputer 19. In this way, the microcomputer 19 can detect the connection of the operating-part main unit 20. In the diagram, SWD $V_{DD}$ indicates a terminal to generate a control signal for controlling the ON/OFF operation of the switching circuit 10B. KEY DATA indicates a terminal to receive key data from the operating-part main unit 20 side.

The operating-part main unit 20 has the 5 V power supply terminal 21a, data I/O terminal 21b, 8 V power supply terminal 21c, and detachment sense terminal 15b in correspondence to the terminals on the apparatus main unit 10 side, respectively.

The microcomputer 25 is connected to the 5 V power supply terminal 21a and data I/O terminal 21b. The illuminating lamp 27 is connected to the 8 V power supply terminal 21c.

Figure 6:
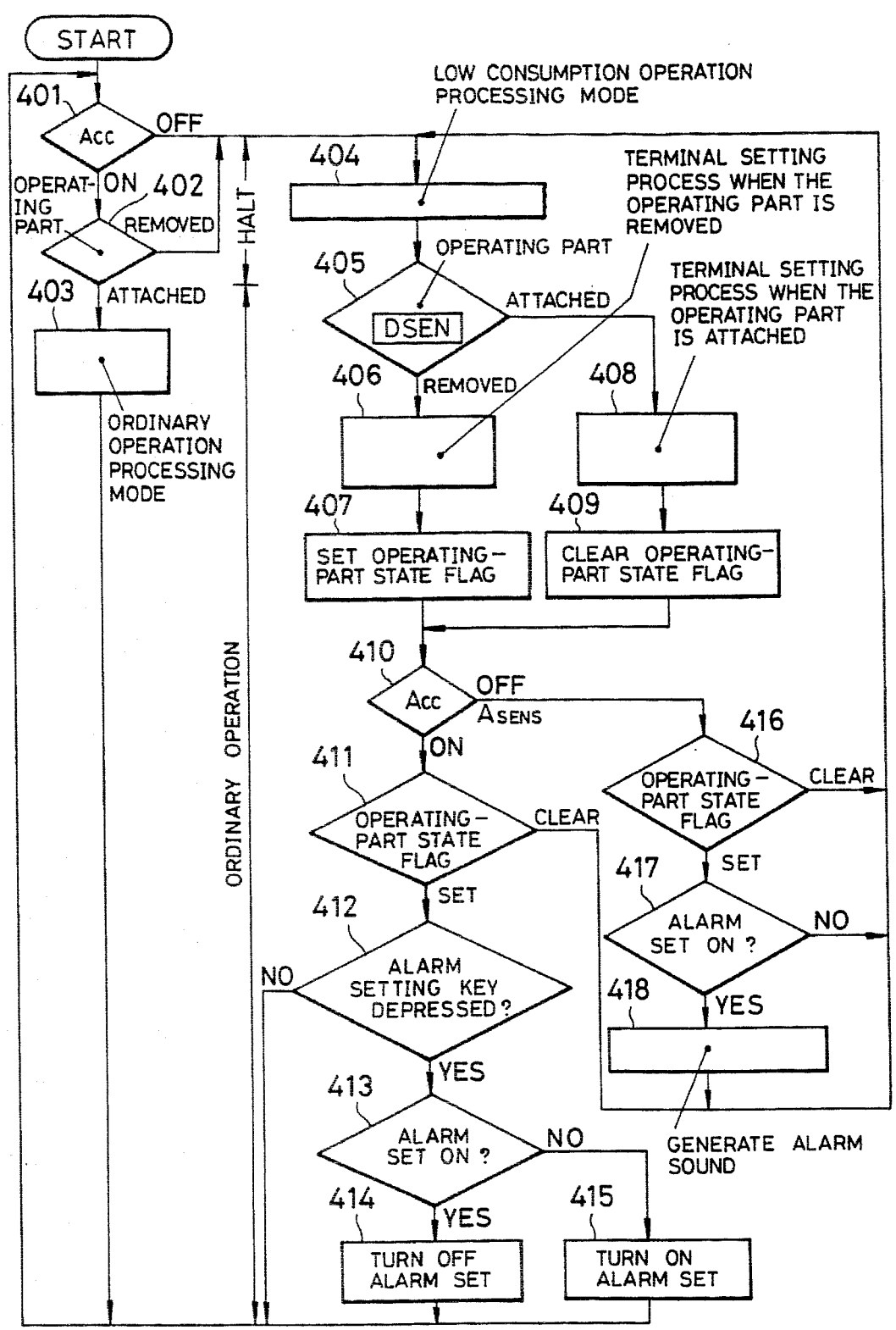
FIG. 6 is a flowchart for explaining the operation of the car-stereo equipment of FIG. 5.

The fundamental operation of the car stereo with such a construction is as mentioned above. In the low consumption operation processing mode of the microcomputer 19, the car stereo operates in accordance with a flow shown in FIG. 6.

That is, when the ACC position of the ignition key 30 is turned on (step 401), a check is made to see if the operating-part main unit 20 has been attached into or removed from the apparatus main unit 10 (step 402). When the operating-part main unit 20 is attached to the apparatus main unit 10, an ordinary operating process is executed (step 403). In the ordinary operating process, the SWD $V_{DD}$ terminal and A/D port of the microcomputer 19 on the apparatus main unit 10 side are turned on or the KEY DATA terminal is set into a standby mode.

In this instance, the microcomputer 19 is driven by the reference voltage $V_{DD}$ as shown in FIG. 7(a).

On the other hand, when it is determined (in steps 401 and 402) that the ACC position of the ignition key 30 is OFF, or the ignition key 30 is ON and the operating-part main unit 20 has been removed from the apparatus main unit 10, a low consumption operating process is executed (step 404).

Namely, in the low consumption operating process here, the SWD $V_{DD}$ terminal and A/D port of the microcomputer 19 on the apparatus main unit 10 side are turned off and the operation to set the KEY DATA terminal into the standby mode is intermittently stopped. Consequently, only the memory in the microcomputer 19 receives the electric power and maintains the storage of information. In this instance, the microcomputer 19 is turned off every period of time of 30 msec as shown in FIG. 7(b). The foregoing ordinary operating process is executed only for a period of time during which the voltage of the microcomputer 19 rises to $V_{DD}$ every period of time of 30 msec.

During the ordinary operating process, when the removal of the operating-part main unit 20 is detected (step 405), a terminal setting process at the time of removal of the operating-part main unit is executed and a operating part state flag is set (steps 406 and 407).

On the other hand, when the installation of the operating-part main unit 20 is detected (step 405), a terminal setting process at the time of installation of the operating-part main unit is executed and the operating part state flag is cleared (steps 408 and 409).

When the ACC position of the ignition key 30 is turned on (step 410), the state of flag (in steps 407 and 409) are judged (step 411). When it is determined that the flag has been set, a check is made to see if an alarm setting key (not shown) has been operated or not (step 412).

In the alarm setting here, when the microcomputer 19 detects the negligence of the removal of the operating-part main unit 20 in the OFF state of the ignition key 30, either one of the mode to generate an alarm sound and the mode to generate no alarm sound is designated (steps 414 and 415). When the alarm sound is generated (YES in step 412), the negligence of the removal of the operating-part main unit 20 can be informed by the alarm sound (step 415). An alarm setting key is provided at a predetermined position on the operating-part main unit 20 side.

On the other than, when the ACC position of the ignition key 30 is turned off (in step 410), the states of flag (steps 407 and 409) are judged (step 416). When it is decided that the flag has been set, a check is made to see if the alarm setting key has been depressed or not in a manner similar to that mentioned above (step 417). When the alarm setting key is depressed, the alarm sound is generated (step 418).

According to the embodiment as mentioned above, the microcomputer 19 detects the OFF state of the ACC position or the attached/detached state of the operating-part main unit 20, thereby intermittently stopping the ordinary operating process of the microcomputer 19 itself, namely, the operation to turn on the SWD $V_{DD}$ terminal and A/D port or the operation to set the KEY DATA terminal into the standby mode. Only when information is held in the memory in the microcomputer 19, the low consumption operating process which consumes an electric power is executed.

By detecting the attached/detached state of the operating-part main unit 20, accordingly, the microcomputer 19 can be allowed to perform the low consumption operation. Therefore, even in the case where the ignition key 30 in FIG. 2 doesn't have the ACC position, namely, when the backup line 31a is directly coupled with the ACC line 31b through the short-circuit line 31c, a large amount of dark current is not consumed, so that the complete extinction of the battery voltage can be prevented.

As described above, the car stereo according to the first aspect of the present invention contemplates to prevent the complete extinction of the battery voltage due to the apparatus installed in the vehicle in which the ignition key doesn't have the accessory position. When the installation detection means detects the removal of the operating-part main unit, the operation of the microcomputer on the apparatus main unit side is shifted from the ordinary operation processing mode to the low consumption operation processing mode by the mode shifting means.

Even in the case where the apparatus is installed in the vehicle in which the ignition key doesn't have the accessory position, consequently, when the operating-part main unit is removed from the apparatus main unit, the generation of the dark current in the ordinary operation mode of the microcomputer can be blocked, so that the complete extinction of the battery voltage can be prevented.

Figure 3:
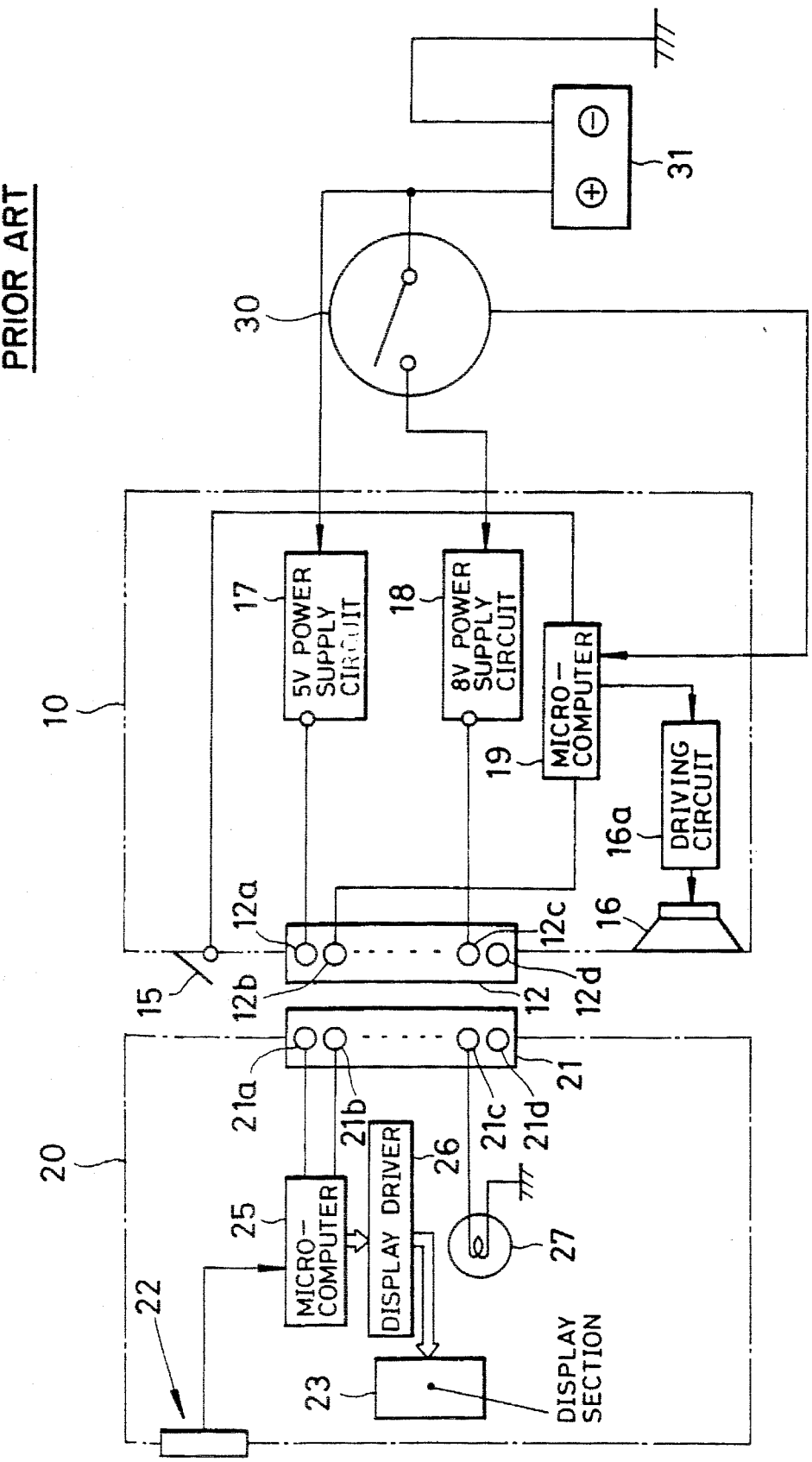

The second embodiment of the present invention will now be described in detail with reference to the drawings. In the following diagrams, the component elements which are common to those shown in FIGS. 1 and 3 are designated by the same reference numerals and their overlapped descriptions are omitted here.

Figure 8:
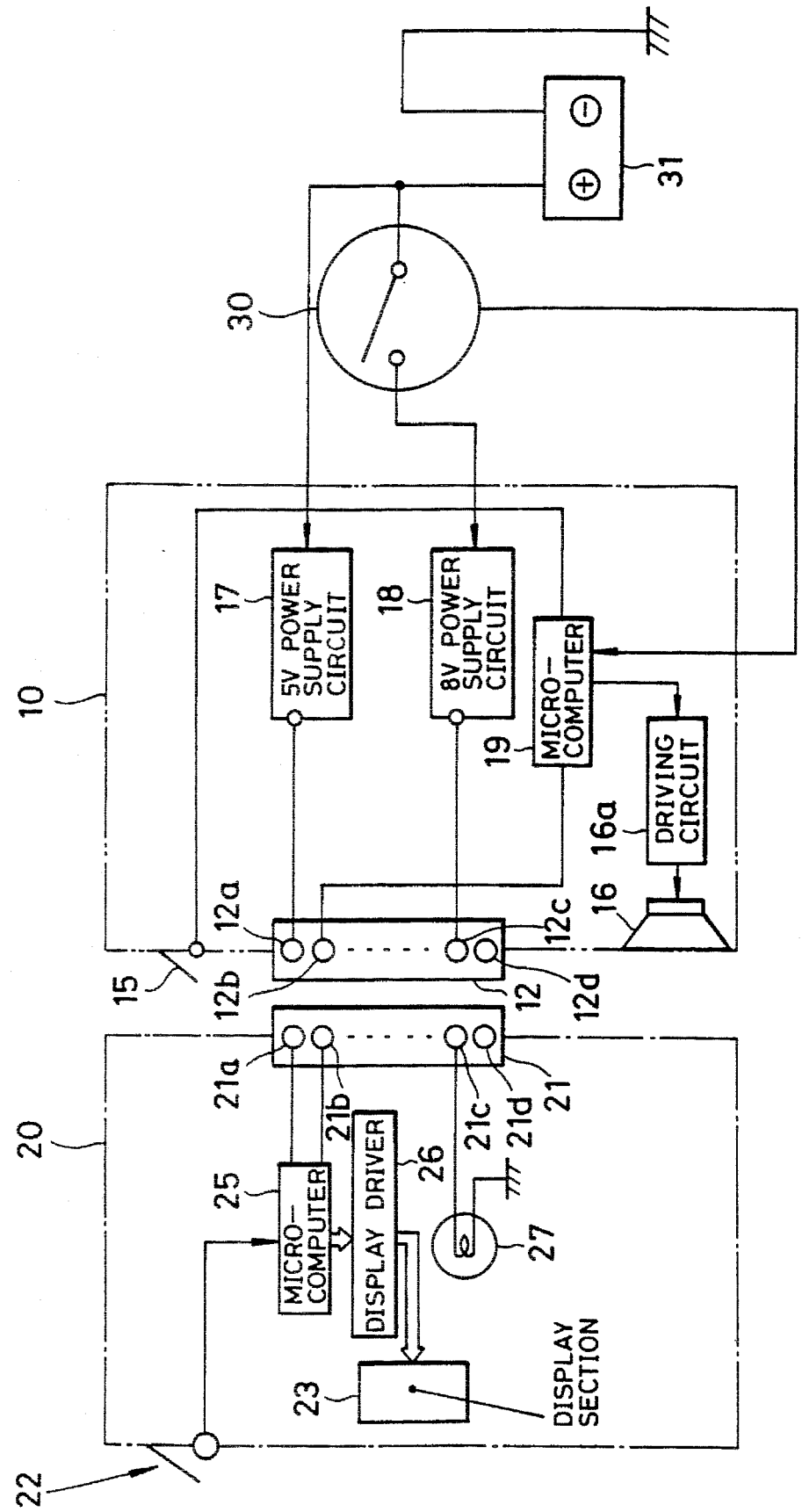
FIG. 8 is a diagram showing an internal construction of an apparatus main unit according to the second embodiment of a car-stereo equipment of the present invention.

FIG. 8 shows an internal construction of the car stereo according to the invention. The connector 12 has the 5 V power supply terminal 12a, data I/O terminal 12b, 8 V power supply terminal 12c, and ground terminal 12d. The 5 V power supply circuit 17 is connected to the 5 V power supply terminal 12a. The 8 V power supply circuit 18 is connected to the 8 V power supply terminal 12c.

An electric power from the battery 31 is supplied to the 5 V power supply circuit 17 and 8 V power supply circuit 18 through the ignition key 30, respectively.

The microcomputer 19 is connected to the data I/O terminal 12b.

The connector 21 of the operating-part main unit 20 has the 5 V power supply terminal 21a, data I/O terminal 21b, 8 V power supply terminal 21c, and ground terminal 21d in correspondence to the terminals on the connector 12 side.

The microcomputer 25 is connected to the 5 V power supply terminal 21a and data I/O terminal 21b. The display driver 26 controls the display operation of the display section 23 on the basis of a control signal from the microcomputer 25. The illuminating lamp 27 is connected to the 8 V power supply terminal 22c.

When the alarm generation is set or canceled, an alarm setting/canceling function is provided for either one of the various kinds of function buttons 22 shown in FIG. 1. When the alarm generation is set, for instance, the function button 22 is turned on and the ignition key 30 is turned on, the alarm is set to ON. The ON state of the alarm is stored in the memory (not shown) in the microcomputer 19 on the apparatus main unit 10 side. The ON state is maintained even when the ignition key 30 is repetitively turned on/off.

When the setting of the alarm is canceled or set to an OFF state, such as when another different one of the function buttons 22 is turned on and the ignition key 30 is turned on in a manner similar to the case mentioned above, the storage state of the memory in the microcomputer 19 is updated to the alarm off state. The OFF state is also maintained in a manner similar to that mentioned above.

When the alarm is set or canceled, the invention is not limited to the above construction such that the alarm setting/canceling function is provided for either one of the various kinds of function buttons 22 as mentioned above. A special button for setting/canceling the alarm can be also newly added.

Figure 9:
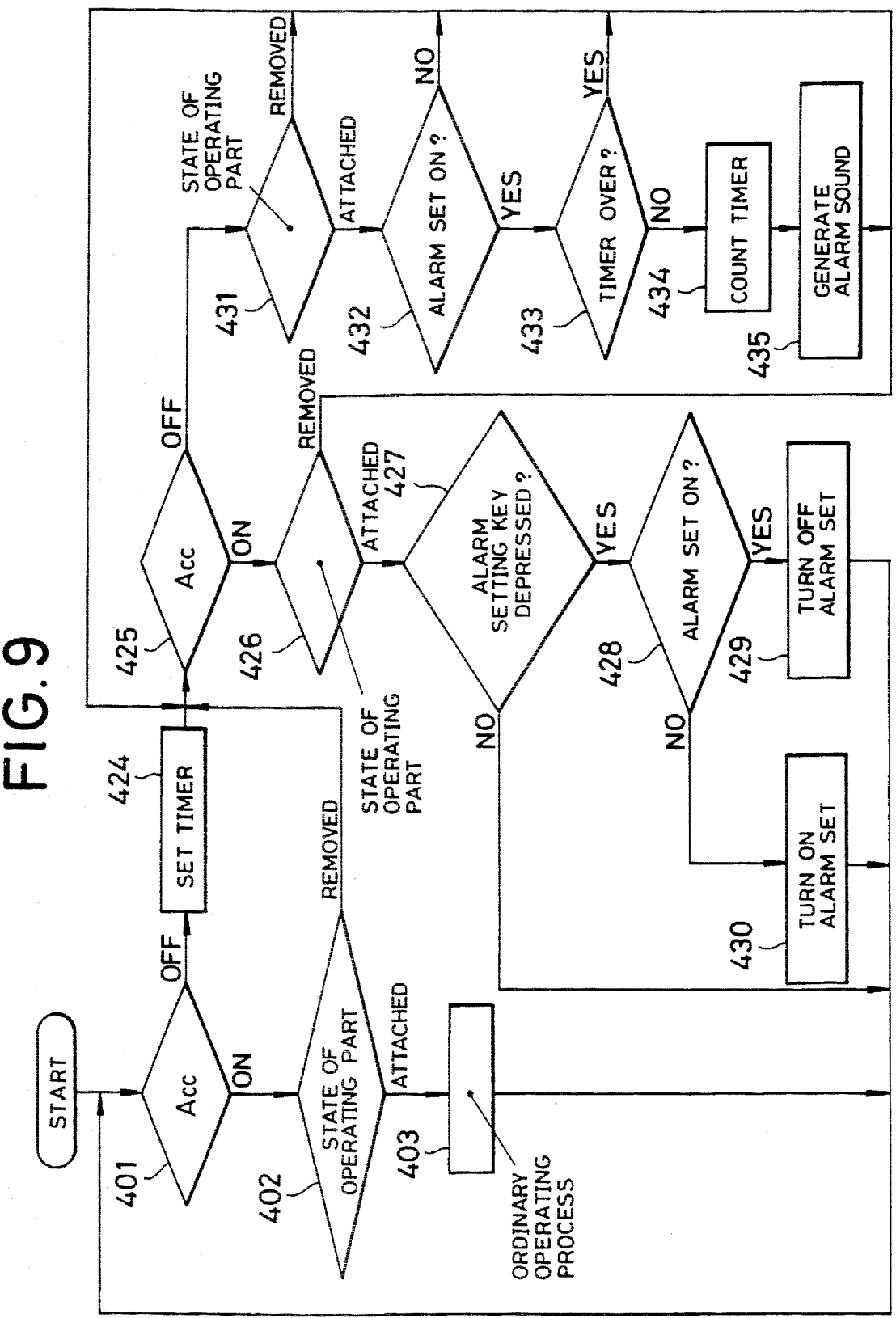
FIG. 9 is a flowchart for explaining the operation of the car-stereo equipment of FIG. 8.

The operation of the car stereo with such a construction as mentioned above will now be described with reference to FIG. 9. In the following description, it is assumed that the initial set state of the memory in the microcomputer 19 on the apparatus main unit 10 side has been set to alarm ON.

First, when the microcomputer 19 on the apparatus main unit 10 side detects the ON state of the ignition key 30 (ON state of the accessory position) and the ON state of the installation detection switch 15, the foregoing ordinary operations are executed (steps 401 to 403).

On the other hand, when the ignition key 30 is turned off (OFF state of the accessory position) and the microcomputer 19 detects such an OFF state, a timer (not shown) in the microcomputer 19 is set to a predetermined time (steps 401 and 424).

After the timer was set, the ON/OFF state of the ignition key 30 is again detected (step 425). When it is determined that the ignition key 30 is continuously held to the OFF state, the removal state of the operating-part main unit 20 is again detected. When it is decided that the operating-part main unit 20 is not removed irrespective of the OFF state of the ignition key 30 (step 431), the set state of the alarm is judged (step 432).

As mentioned above, since the initial set state of the memory in the microcomputer 19 on the apparatus main unit 10 side has been set to alarm ON, the alarm sound is generated while executing the time counting operation until the time count value of the timer reaches the time set in step 424 (steps 433 to 435).

When the operating-part main unit 20 is removed from the apparatus main unit 10 before the time count value reaches the set time (step 431) and when the time count value reaches the set time (step 433), the generation of the alarm sound is stopped.

The above processing routine relates to the case where the initial set state of the memory in the microcomputer 19 on the apparatus main unit 10 side is set to alarm ON and the alarm sound is generated. When the user doesn't want to generate the alarm sound, namely, when the setting of the alarm is canceled, the function button 22 is turned on, the ignition key 30 is turned on, and the storage data in the memory in the microcomputer 19 is updated to alarm OFF in a manner as mentioned above.

A processing flow in such a case is as follows.

That is, when the function button 22 is depressed and the ignition key 30 is turned on (step 425 to 427), the data of alarm ON as an initial set state of the memory in the microcomputer 19 is updated to the date of alarm OFF (steps 428 and 429). Thus, even when the ignition key 30 is turned off (step 425), the alarm is set to OFF (step 432), so that the generating operation of the alarm sound is not performed.

In the embodiment as mentioned above, when the microcomputer 19 detects the OFF state of the accessory position of the ignition key 30 and the OFF state of the installation detection switch 15 and, further, when the set state of the memory in the microcomputer 19 is set to alarm ON, the speaker 16 is controlled so as to generate the alarm sound for a predetermined time.

When the alarm sound is unnecessary, by depressing the function button 22 with the ignition key 30 ON, the storage state in the memory in the microcomputer 19 is updated to alarm OFF. Therefore, even when the ignition key 30 is turned off, no alarm sound is generated, so that an unpleasant feeling by the alarm sound is eliminated.

As described above, in the car stereo according to the second aspect of the present invention, when the installation detection means detects the connection of the operating-part main unit and the ON/OFF detecting means detects the OFF state of the accessory position and, further, alarm ON is set by the setting means, the alarm is generated from the alarm generating means. In the case where the alarm sound is unnecessary, therefore, by setting alarm OFF by the setting means, the unpleasant feeling by the alarm can be eliminated.

Figure 4:
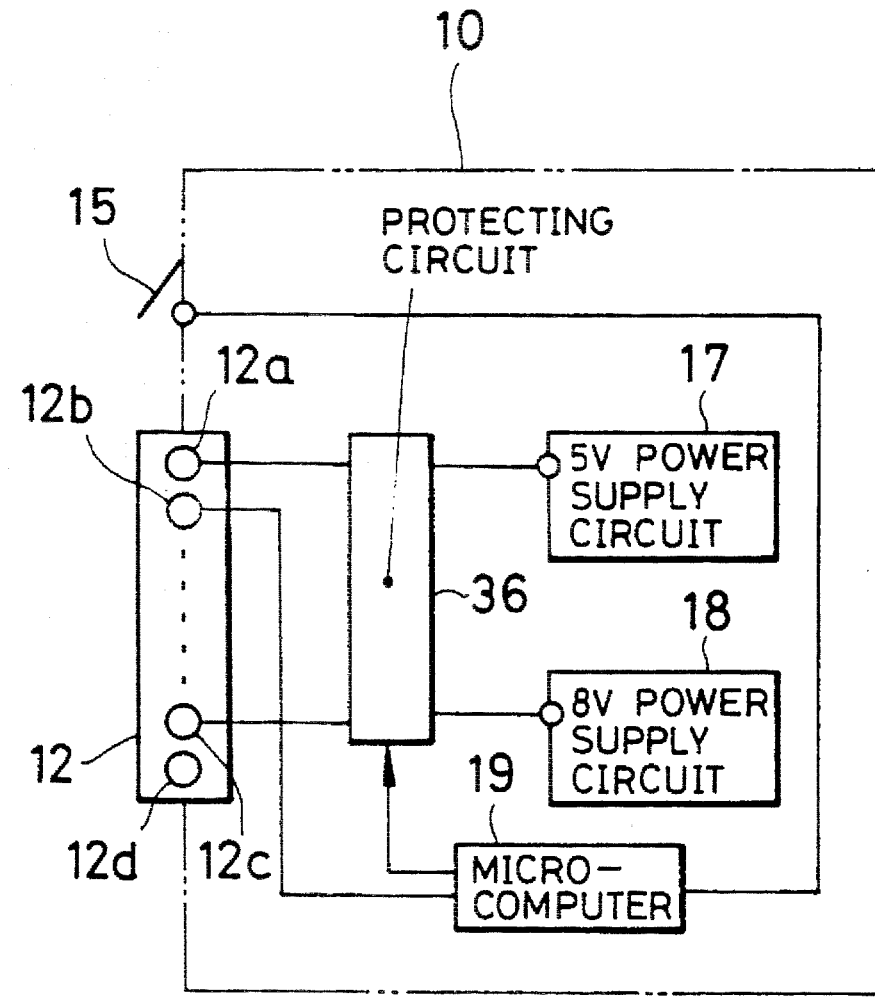
FIG. 4 is a diagram showing an internal construction of an apparatus main unit according to another example of the conventional car-stereo equipment of the detachable type.

The third embodiment of the present invention will now be described in detail hereinbelow with reference to the drawings. In the following diagrams, the component elements which are common to those shown in FIGS. 1, 2, and 4 are designated by the same reference numerals and their overlapped descriptions are omitted.

Figure 10:
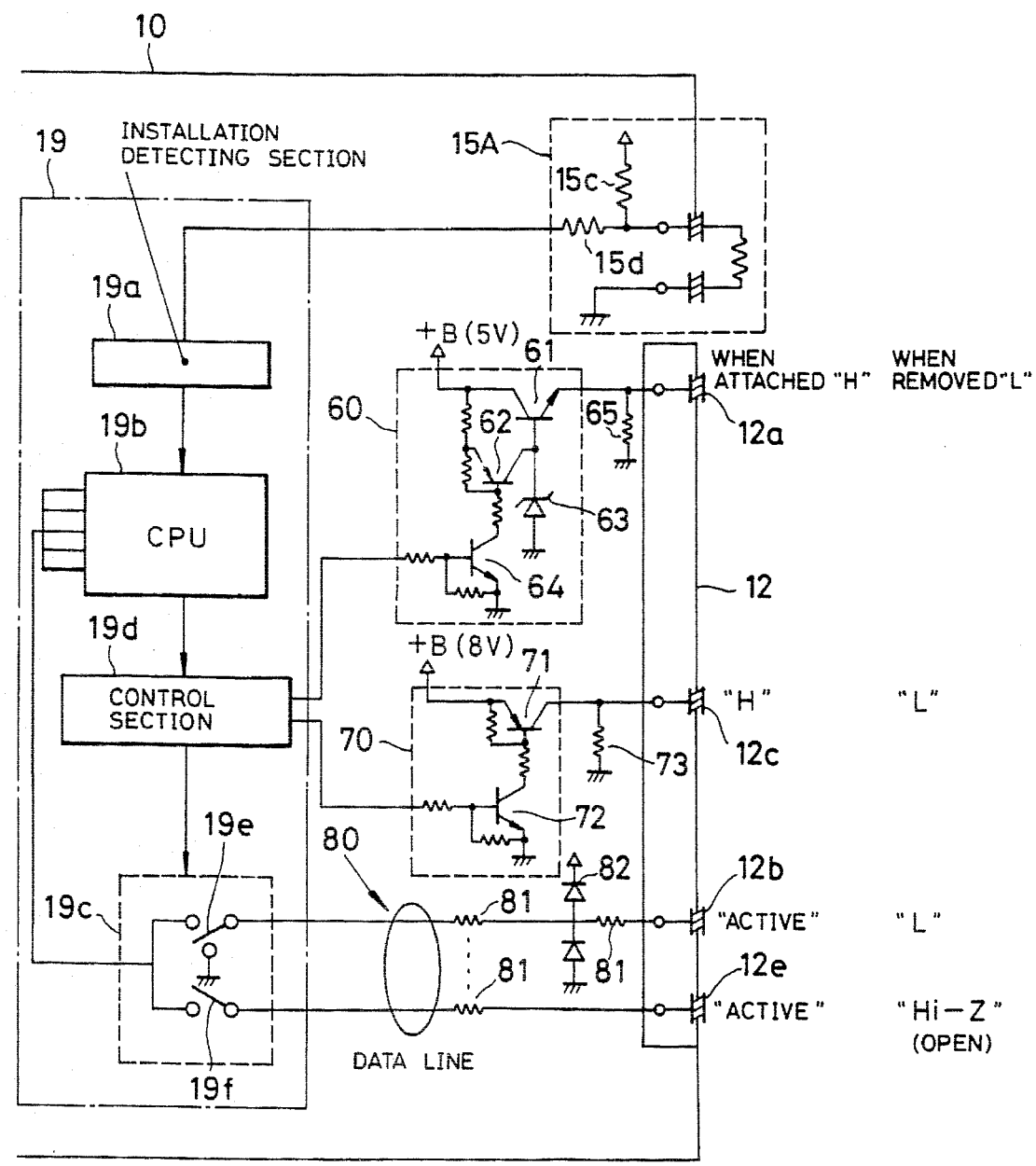
FIG. 10 is a diagram showing an internal construction of an apparatus main unit according to the third embodiment of a car-stereo equipment of the present invention.

FIG. 10 shows an internal construction of the apparatus main unit 10 according to the car-stereo equipment of the present invention. The connector 12 has the 5 V power supply terminal 12a, data I/O terminals 12b and 12e, and 8 V power supply terminal 12c. The 5 V power supply terminal 12a and 8 V power supply terminal 12c are connected to the microcomputer 19 through power supply limiting circuits 60 and 70.

The data I/O terminals 12b and 12e and an installation detection switch section 15A are also connected to the microcomputer 19.

The installation detection switch section 15A has a pull-up resistor 15c and a resistor 15d. The switch section 15A is of the voltage value type and the microcomputer 19 recognizes the attached/detached state of the operating-part main unit 20 on the basis of a change in voltage value of the switch section 15A. The installation detection switch section 15A is not limited to the voltage value type but can also use the mechanical installation detection switch 15 as shown in FIG. 1.

The microcomputer 19 has an installation detection section 19a to detect the attached/detached state of the operating-part main unit 20 on the basis of the change in voltage value of the switch section 15A. A signal indicative of the result of the detection of the installation detection section 19a is supplied to a CPU 19b.

The CPU 19b sends predetermined data to the data I/O terminals 12b and 12e through a data transmission change-over section 19c and, can send a control signal to set the input/output terminal voltage of each terminal of the connector 12 volts or 0 volts (an open state) to a control section 19d when the operating-part main unit 20 is removed from the apparatus main unit 10.

The data transmission change-over section 19c has switches 19e and 19f which are turned on/off on the basis of control signals from the control section 19d. Data lines 80 between change-over section 19c and terminals 12b, 12e have resistors 81 and diodes 82.

The power supply limiting circuit 60 has a transistor 61. A reference power source (5 V) is supplied to the collector side of the transistor 61. A transistor 62 to limit a bias current is interposed between the collector and base of the transistor 61. A Zener diode 63 to generate a predetermined voltage when the bias current is supplied is connected to the base side of the transistor 61.

A transistor 64 to limit a base current of the transistor 62 is connected to the base side of the transistor 62. The control section 19d is connected to the base side of the transistor 64.

When the transistor 64 is, for instance, turned on by a control signal from the control section 19d, the base current of the transistor 62 decreases and the transistor 62 is turned off. Thus, no bias current flows between the collector and base of the transistor 61, so that the transistor 61 is turned off.

The power supply limiting circuit 70 has a transistor 71 and a reference power source (8 V) is supplied to the collector side. A transistor 72 to limit a base current of the transistor 71 is connected to the base side of the transistor 71. The control section 19d is connected to the base side of the transistor 72. When the transistor 72 is turned on by a control signal from the control section 19d, the base current of the transistor 71 decreases and the transistor 71 is turned off.

Reference numerals 65 and 73 in the diagram denote pull-down resistors.

Figure 11:
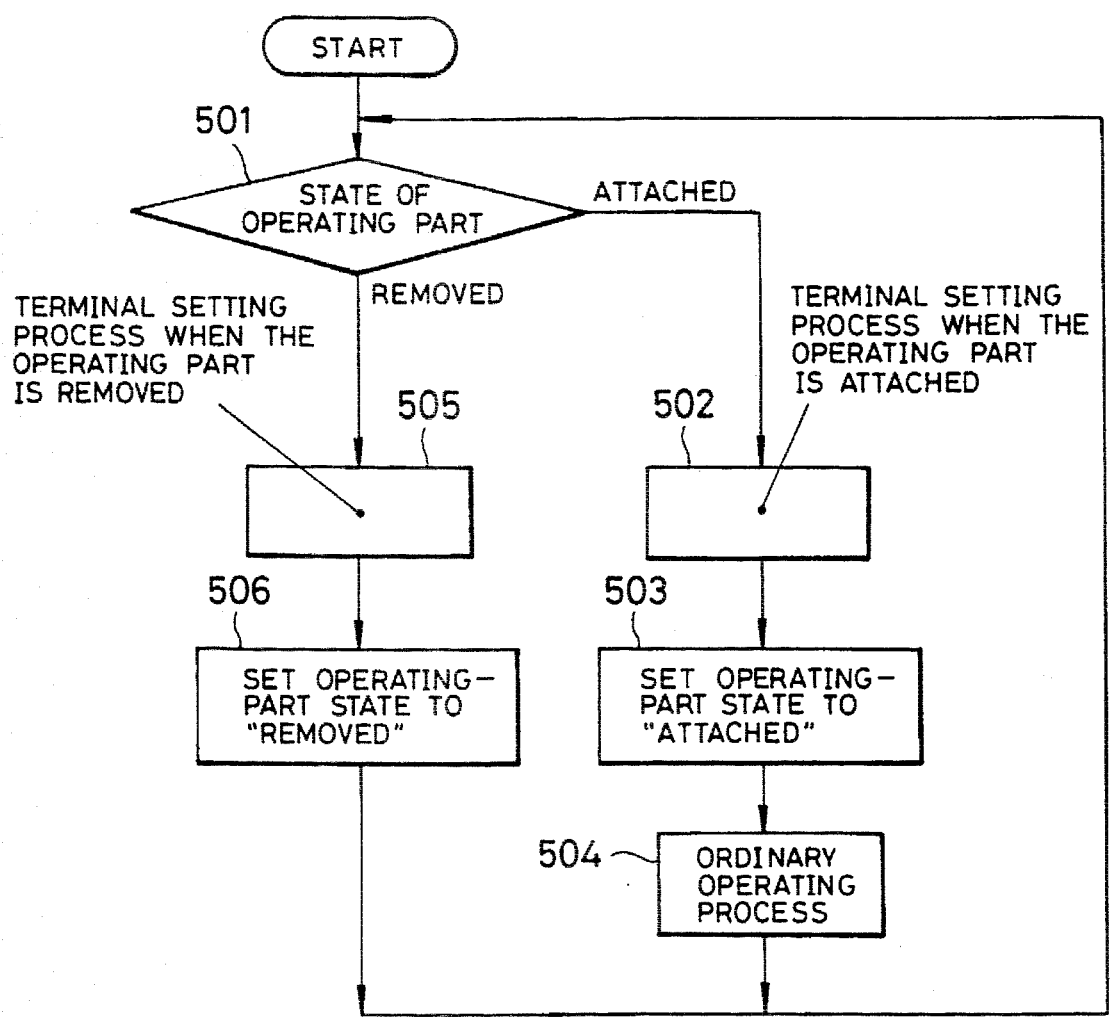
FIG. 11 is a flowchart for explaining the operation of the car-stereo equipment of FIG. 10.

The operation of the car stereo with such a construction will now be described with reference to FIG. 11.

First, when the operating-part main unit 20 is attached to the apparatus main unit 10, a voltage value of the installation detection switch section 15A decreases, so that the installation detection section 19a detects the attaching of the operating-part main unit 20 (step 501). The detecting section 19a generates a detection signal indicative of the attaching of the operating-part main unit 20, so that the CPU 19b recognizes that the operating-part main unit has been attached.

When the CPU 19b recognizes the connection of the operating-part main unit 20, the CPU executes a terminal setting process upon connection of the operating-part main unit and, thereafter, sets the operating part state into "attaching" and generates a control indicative of the "attaching" state to the control section 19d. After that, the CPU executes the ordinary operation (steps 502 to 504).

That is, when the control section 19d sends an OFF signal to the power supply limiting circuits 60 and 70, the transistors 61 and 71 are set to the ON state by the operations opposite to those mentioned above. Consequently, terminal voltages of the 5 V power supply terminal 12a and 8 V power supply terminal 12c are increased to 5 V and 8 V (namely, set into the "H" state), respectively.

In the data transmission change-over section 19c, the switches 19e and 19f are turned on on the basis of control signals from the control section 19d, so that the data I/O terminals 12b and 12e are made active (in other words, set into the "H" state).

On the other hand, when the operating-part main unit 20 is removed from the apparatus main unit 10, the voltage value of the installation detection switch section 15A rises up to the voltage across the terminals of the pull-up resistor 15c, so that the installation detection section 19a detects the removal of the operating-part main unit 20 (step 501). The installation detection section 19a sends a detection signal indicative of the removal of the operating-part main unit 20, so that the CPU 19b recognizes the removal of the operating-part main unit.

When the CPU 19b recognizes the removal of the operating-part main unit 20, the terminal setting process at the time of removal of the operating-part main unit is executed. After that, the operating part state is set to "removal" and a control signal to instruct the "removal" state is sent to the control section 19d (steps 505 and 506).

That is, when the control section 19d sends an ON signal to the power supply limiting circuits 60 and 70, the transistors 61 and 71 are turned off by the foregoing operations. The terminal voltages of the 5 V power supply terminal 12a and 8 V power supply terminal 12c are, thus, reduced to 0 V (namely, set into the "L" state), respectively.

In the data transmission change-over section 19c, since both of the switches 19e and 19f are turned off on the basis of control signals from the control section 19d, the data I/O terminal 12b is set to the "L" state and the data I/O terminal 12e is set to the "open state".

According to the embodiment as mentioned above, the installation detection section 19a detects the removal of the operating-part main unit 20 on the basis of the decrease in voltage value of the installation detection switch section 15A. Further, when the CPU 19b detects the removal of the operating-part main unit, the control section 19d sends control signals to the power supply limiting circuits 60 and 70 and data transmission change-over section 19c. By this operation, the terminal voltages of the 5 V power supply terminal 12a and 8 V power supply terminal 12c are set into the "L" state. Further, the terminal voltages or terminal states of the data I/O terminals 12b and 12e are set into the "L" state and "open state".

Since no voltage is applied to each terminal on the apparatus main unit 10 side at the time of removal of the operating-part main unit 20, accordingly, even in the case where terminals are erroneously come into contact or the like, no short-circuit occurs. Since no voltage is applied to the terminals on the apparatus main unit 10 side, there is no need to use the shutter 13 to cover the terminals on the apparatus main unit 10 side, sliding mechanism to slide the shutter 13, protecting circuit 36 to prevent a breakage of the internal circuit in the case where a short-circuit occurs, and the like which are necessary in the prior art apparatus.

The construction of the apparatus main unit 10, thus, can be simplified and the short-circuit can be also certainly prevented.

As described above, in the car stereo according to the third aspect of the present invention, when the operating-part main unit is removed, the voltages or states of a plurality of terminals on the apparatus main unit side are set to 0 V or open state. There is no need to use the shutter to cover a plurality of terminals on the apparatus main unit side, sliding mechanism to slide the shutter, protecting circuit to prevent a breakage of the internal circuit when a short-circuit occurs, and the like which were necessary in the prior art apparatuses. Thus, the short-circuit can be certainly prevented and the construction of the apparatus main unit is simplified, so that the costs can be reduced.

What is claimed is:

1. In a car stereo equipment having an apparatus main unit which is installed in a vehicle and a operating-part main unit which is detachably provided with respect to said apparatus main unit, the improvement comprising:

installation detection means for detecting an attached/detached state of said operating-part main unit on the apparatus main unit; and mode shifting means for shifting the operation of a microcomputer of the apparatus main unit from an ordinary operation processing mode to a low consumption operation processing mode, in which a voltage of a power supply to elements of said microcomputer other than an internal memory is reduced intermittently, when the removal of the operating-part main unit is detected by said installation detection means.

2. In a car stereo equipment having an apparatus main unit which is installed in a vehicle and a operating-part main unit which is detachably provided with respect to said apparatus main unit, the improvement comprising:

an ON/OFF detecting means, on the apparatus main unit, for detecting an ON/OFF state of an accessory position of an ignition key of said vehicle;

installation detection means, on the apparatus main unit, for detecting an attached/detached state of said operating-part main unit on the apparatus main unit;

alarm generating means, on the apparatus maid unit, for generating alarm;

setting means on the operating-part main unit for setting an ON/OFF state of generation of alarm by said alarm generating means; and alarm generation control means connected to said alarm generating means, said ON/OFF detecting means, and said installation detection means for controlling said alarm generating means to generate alarm for a predetermined period of time when the OFF state of the accessory switch, the attached state of the operating-part main unit and the ON state of generation of alarm are detected on the basis of a result of detection of said ON/OFF detecting means, the ON/OFF state of said setting means, and a timer which is provided in the apparatus main unit.

3. In a car stereo equipment having an apparatus main unit and an operating-part main unit which is detachably provided with respect to said apparatus main unit, the improvement comprising:

installation detection means, provided in the apparatus main unit, for detecting an attached/detached state of said operating-part main unit;

terminals on the apparatus main unit for delivering a predetermined driving electric power and data to the operating-part main unit;

supply limiting means for limiting the supply of the driving electric power and data to said terminals; and mode shifting means connected to the installation detection means for shifting power consumption modes of a microcomputer of the apparatus main unit from a normal power consumption mode to a lower power consumption, in which a voltage of a power supply to elements of said microcomputer other than an internal memory is reduced intermittently, when the operating-part main unit is detached from the apparatus main unit, wherein said supply limiting means operates to prevent the delivery of the driving electric power and data to said terminals when the removal of the operating-part main unit is detected by said installation detection means.

\* \* \* \* \*